United States Patent [19]
Reinhardt et al.

[11] 3,870,853
[45] Mar. 11, 1975

[54] TRAVELING WELDING MACHINE

[75] Inventors: Paige J. Reinhardt, St. Paul; Fred A. Olson, Minneapolis, both of Minn.

[73] Assignee: Paper, Calmenson & Co., St. Paul, Minn.

[22] Filed: Aug. 1, 1973

[21] Appl. No.: 384,592

[52] U.S. Cl............... 219/125, 228/25, 228/44, 228/45
[51] Int. Cl................................ B23k 9/12
[58] Field of Search .............. 228/4, 44, 25, 45; 219/124, 125, 130; 29/200 J, 200 P

[56] References Cited
UNITED STATES PATENTS

| | | | |
|---|---|---|---|
| 3,164,713 | 1/1965 | Banks et al. | 219/124 |
| 3,291,360 | 12/1966 | Linnander | 228/44 |
| 3,444,352 | 5/1969 | Ogden et al. | 219/125 |
| 3,712,529 | 1/1973 | Ozawa et al. | 228/44 |
| 3,764,056 | 10/1973 | Edwards | 228/4 |
| 3,779,444 | 12/1973 | Kensrue | 29/200 P X |

Primary Examiner—Francis S. Husar
Assistant Examiner—Gus T. Hampilos
Attorney, Agent, or Firm—Jacobson and Johnson

[57] ABSTRACT

A traveling welding machine which simultaneously holds and welds the flanges to the web of built up plate girders while using the girder as a track and guide.

1 Claim, 3 Drawing Figures

TRAVELING WELDING MACHINE

BACKGROUND OF THE INVENTION

1. Field of the Invention

This invention relates generally to welding machines and, more specifically, to a traveling drive up welding machine which uses the girder as a track and guide while the drive up welding machine moves along the girder and holds and welds a pair of flanges to the web of the girder.

2. Description of the Prior Art

In the manufacture of huge girders, particularly of the built up plate girders used for bridges and the like, it is necessary to assemble the girders by a process such as welding. That is, oftentimes plate girders reach a height of eight to ten feet, a width of two to three feet, and a length in excess of 100 feet. This size girder cannot be extruded, consequently, one must weld steel plates together to form the girders. It should be understood that the term "girder" is understood by those skilled in the art to include beams that are too large for extrusion, typically, a beam having a height in excess of three feet.

In order to fabricate a large plate girder, it is necessary to weld a pair of flanges which form the outside parts of the girder against the opposite edges of the web which forms the central portion of the girder. To date, this process has comprised placing the flanges against the edge of the web, intermittently pressing and tacking the flanges to the web followed by welding the flanges to the web or by feeding both the web and the flange into a welding device. However, this procedure is extremely awkward and both time and space consuming to use with the large girders used in bridge construction and the like. The present invention, in contrast, provides a traveling drive up welding machine that uses the unwelded girder as a track while the welding machine simultaneously presses and welds the flanges against the edges of the web of the girder as the machine moves continuously along the girder.

BRIEF SUMMARY OF THE INVENTION

Briefly, the present invention comprises a welding machine that contains rollers for riding on the web of an unassembled girder and means for simultaneously compressing the flanges of the girder against the edges of the web of the girder as the welding heads on the welding machine weld the flanges to the web of the girder. The remaining features of the invention will become apparent in the description of the preferred embodiment.

BRIEF DESCRIPTION OF THE DRAWINGS

Referring to the drawings.

DESCRIPTION OF THE PREFERRED EMBODIMENT

Briefly, our welding machine comprises a unit for compressing the flanges against the edges of the web, a unit for guiding the welding machine along the web, a unit for applying a flux to the area to be welded, a unit for supplying a welding wire to the area to be welded, a unit for welding and a unit for removing the excess flux from the weld.

Figure 1:
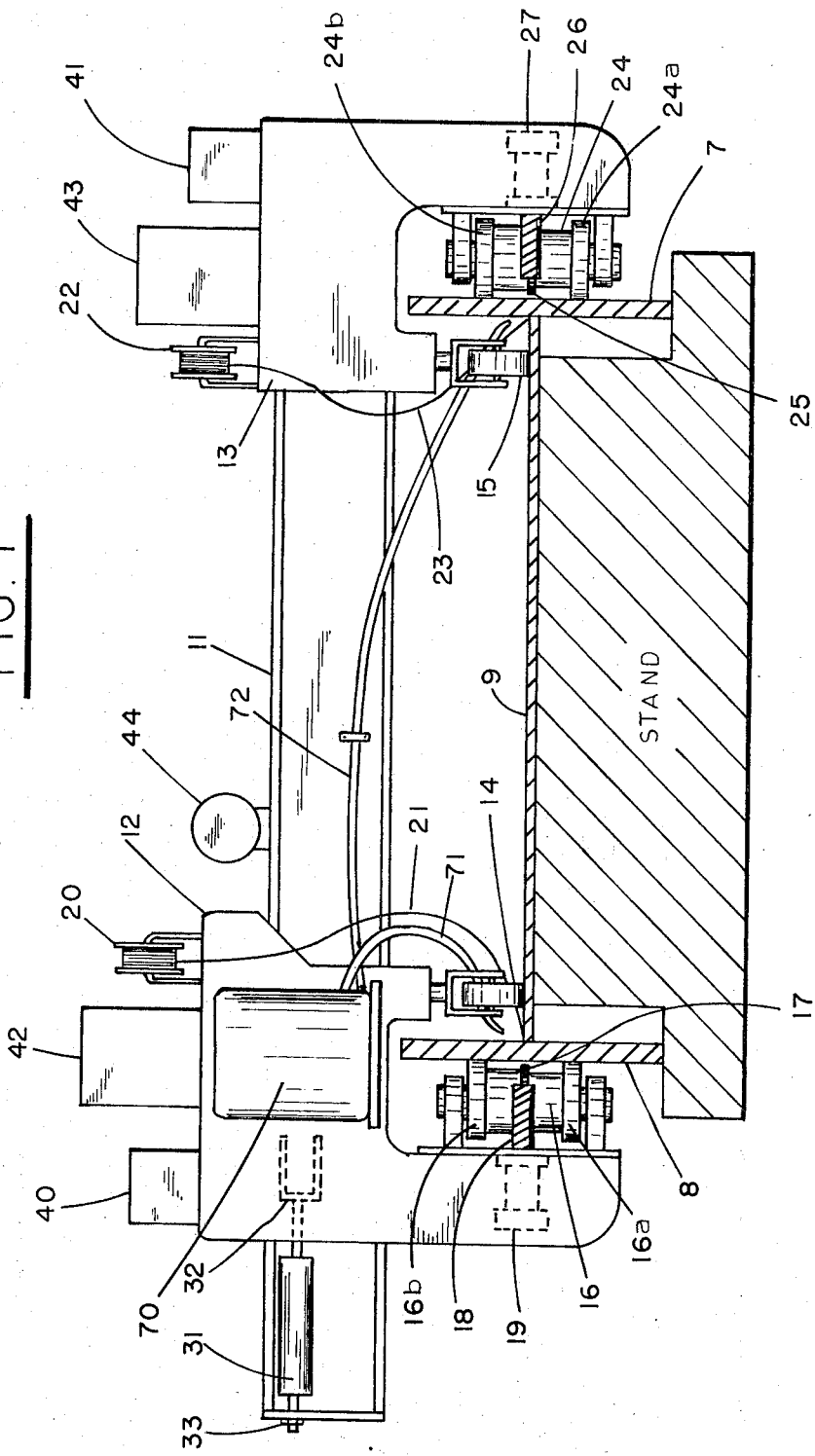
FIG. 1 shows a front elevational view of our traveling welding machine.
Figure 2:
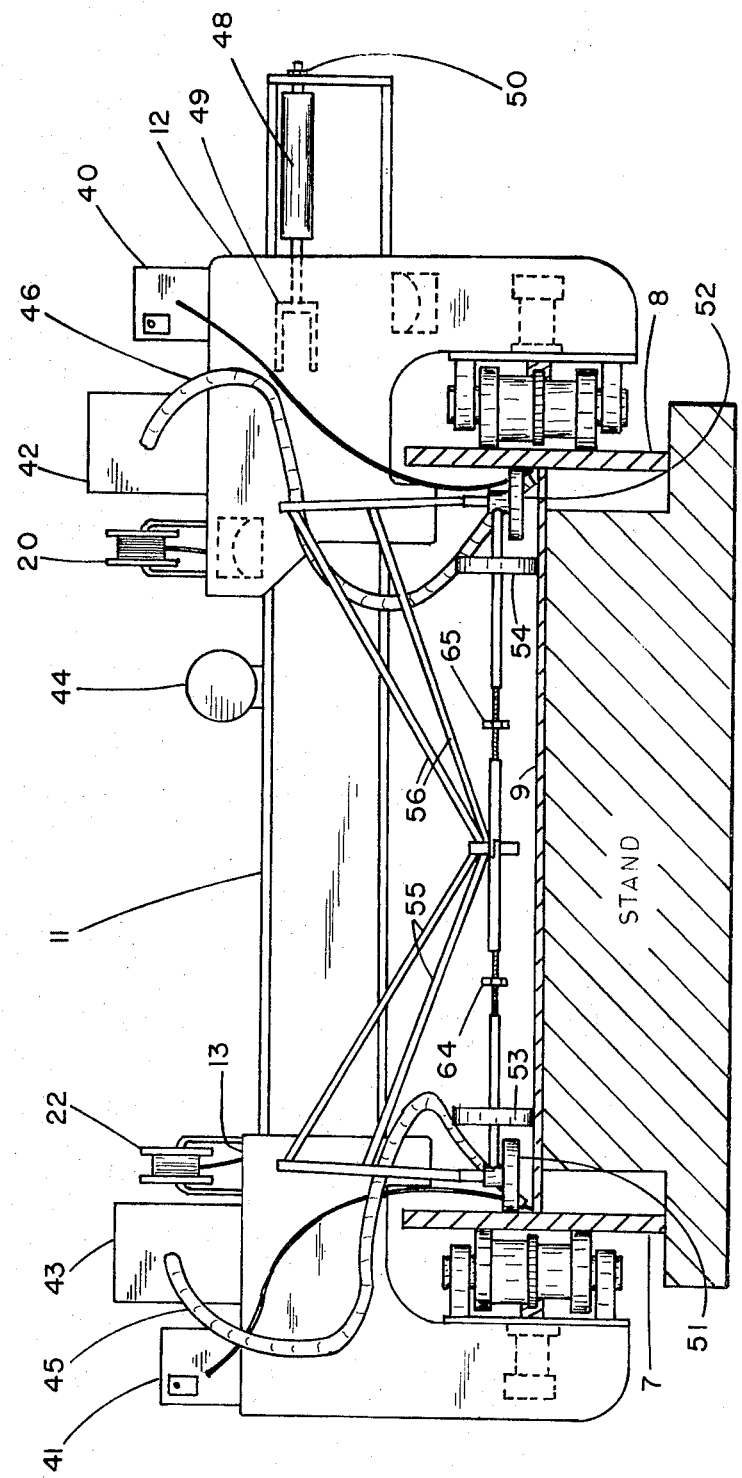
FIG. 2 shows a rear view of our traveling welding machine located on a girder.
Figure 3:
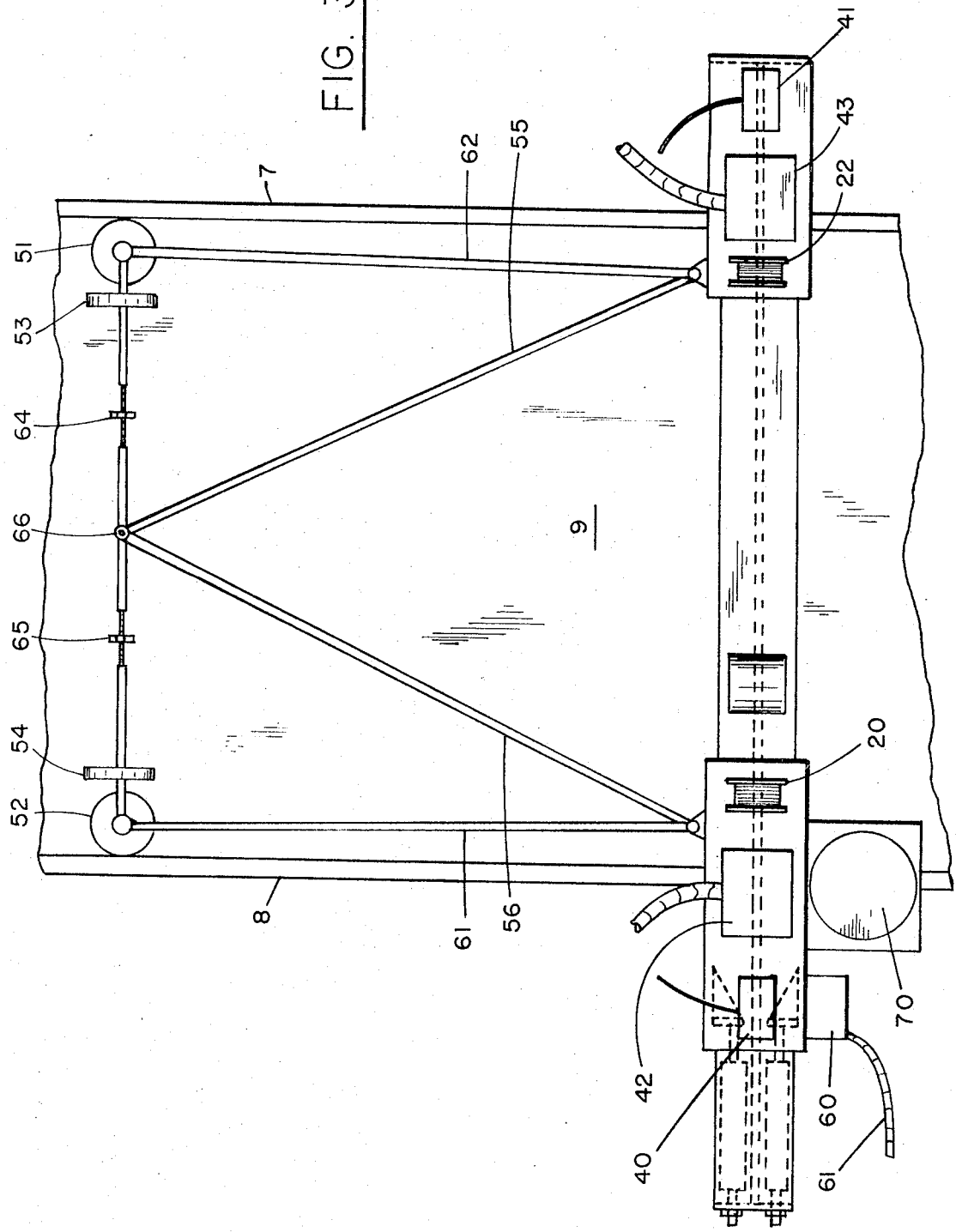
FIG. 3 shows a top view of our traveling welding machine located on a girder.

FIG. 1 shows a front view of the welding machine comprising an I-beam cross or suppport member 11, which extends across the girder to be welded, a first end member 12 which is slidably mounted on cross member 11 and a second member 13 which is fixedly mounted to cross member 11. End member 12 and end member 13 contain both vertical and horizontal support rollers for supporting and guiding the traveling welding machine along the girder to be welded. The girder to be welded comprises a horizontal web 9 and a pair of vertical flanges 7 and 8. End member 12 and 13 contain rollers for compressing flanges 7 and 8 against the edges of web 9. More specifically, located on end member 12 is a roller 14 that supports the left side of the traveling drive up welding machine on web 9. Also located in end member 12 is a second roller 16 which has a pair of roller surfaces 16a and 16b in contact with flange 8. Roller surfaces 16a and 16b are spaced sufficiently far apart so as to be located on opposite sides of web 9. Preferably, the rollers are located equal distance from the edge of the web to prevent applying a torque or twisting motion to the web. Roller 16 contains a worm gear 17 which is driven through a worm 18 by a hydraulic motor 19. Similarly, end member 13 contains a support roller 15 for supporting the right side of the machine and roller 24 which have a first roller surface 24a and a second roller surface 24b which are also located on opposite edges of the web 9. A worm gear 25 is located in the center of the roller and connects to a worm 26 which is driven by hydraulic motor 27. Hydraulic motors 19 and 27 are powered from a suitable power source and through appropriate fluid coupling lines (not shown). In order to withstand the repeated loads and use, it is preferred that the rollers be made from a metal such as steel. It is these two rollers 24 and 16 which simultaneously compress flanges 7 and 8 against the edges of web 9 and propel the traveling welding machine along the girder. Rollers 14 and 15 coact to support the front of the welding machine so that the welding machine rides on the web 9 similar to a train riding on a track. Similarly, a pair of rollers 53 and 54 (FIG. 2 and 3) support the rear of the welding machine to maintain the vertical orientation of the machine and prevent the welding machine from tipping over (FIG. 3).

End member 12 is slidably mounted with respect to member 11 so that by application of hydraulic pressure to hydraulic cylinders 31, (FIG. 1), end member 12 can be either brought closer or further away to accommodate different size girders. In addition, the hydraulic cylinder 31 is used to control the pressure and thereby control the force applied between roller 16 and 24. Note, hydraulic cylinder 31 exerts thrust on member 12 through bracket 32 (indicated by dotted lines); it is fastened to member 11 by rod 33. FIG. 2 will show that for purposes of applying the forces equally, we have located a second hydraulic cylinder 48 in the opposite side which mounts to cross member 11 by rod 50 and end member 12 by bracket 49. By controlling the pressure in cylinders 31 and 48, one can control the force applied against flanges 8 and 9. Typically, we can provide as much as 80,000 pounds of force with the present invention.

The present invention includes two welding units, a first welding unit located on end member 12 and a second welding unit located on end member 13. The welding unit on end member 12 comprises an arc welder 40, a vacuum source 42 for removing excess flux and a source of welding wire 20. Similarly, located on member 13 is an arc welder 41, a source of welding wire 22 and a vacuum source 43 for removing excess flux from the welded area. A common flux source 70 supplies flux to the area to be welded through hoses 71 and 72. Typically, the flux is in powdered form and is carried to the area to be welded by slightly pressurizing flux chamber 70.

The arc welders and the welding wire are known in the art and will not be described in detail. The purpose of the vacuum source is to remove the excess flux left after welding. Because the welding wire heads which are mounted one on each end member are well known in the art, the details of the welding wire heads have also been omitted from the drawing. However, in the preferred embodiment the position of the welding wire head is controlled by a power cylinder so that an operator can remotely control the welding by activating the power cylinder. Also, the means of feeding the wire down to the junction have also been omitted for purposes of simplifying the drawing but in the preferred embodiment the means comprise a member for pulling the wire through the welding wire head.

Referring now to FIG. 3, the top view reveals the guide unit of the invention which is used to maintain the proper orientation of our traveling drive up welding machine as it proceeds along the girder to be welded. One side of the guide unit comprises a first member 55, a second member 62 and a third adjustable member 64 which coact to form a triangular support. Similarly, the other side of the guide unit includes a first member 56, a second member 61 and an adjustable member 65 which also coact to form a triangular support frame. Located at the end of member 62 is a roller 51 which rolls along the inside of the flange 62 and located on adjustable member 64 is a roller 53 that rolls on web 9. Similarly, located on the opposite side and on the end of member 61 is a roller 52 which rolls along flange 8 and a roller 54 that rolls on web 9. These units extend rearward from the main frame 11 a distance of about four to six feet. The purpose of the guide unit is to provide squaring or insuring the orientation of cross member 11 with respect to the girder being welded. The function of the guide unit will become more apparent as a description of the operation of the machine is described in more detail.

In order to weld a girder together, the welding machine must be driven onto the girder from a stand (not shown) which is typically a section of a girder supported on a floor stand. Before driving the welding machine on the girder, the flanges of the girder are fastened in the proper position with respect to the web by clamps and support stand. The purpose of clamping the flanges to the girder is to insure that the flanges are in proper position for compressing against the edges of the web. Once the front portion of the welding machine is on the girder to be welded, the hydraulic cylinders 31 and 48 are powered to produce the desired compressive force of the flanges against the edge of the web. Next, the flux unit is turned on to apply flux to the area to be welded. Next, the welding wire supply units, the arc welders and the vacuum system are placed in a ready condition to be activated by motion of the welding machine. To propel the welding machine along the girder, hydraulic fluid under pressure is supplied to hydraulic motors 27 and 19. Hydraulic motors 27 and 19 power the worm drives 26 and 18 to thereby cause rotation of rollers 16 and 24. As the rollers propel the welding machine along the girder using the girder as a track, it simultaneously pushes flanges 7 and 8 against the edges of the web 9 through the hydraulic cylinders 31 and 48 through a suitable high pressure hydraulic source (not shown). Connected in line to the hydraulic cylinders is hydraulic accumulator 44 which is provided to maintain a constant pressure and thus a constant force of the flanges against the edges of the web. That is, oftentimes there are increases in the width of the web which may be due to different or varying size web and flanges. Consequently, to maintain a constant force of the flanges against the web, it is necessary to provide a hydraulic accumulator in the hydraulic system so that if the girder should vary in height, it would not substantially alter the the force of the flanges against the web. As the function of accumulators in hydraulic systems is well known, a further description of the accumulator is deemed unnecessary.

Once the welding machine is set in motion on the girder to be welded, a number of operations are performed simultaneously. The operations performed simultaneously are: (1) holding the flanges against the web; (2) applying flux to the region to be welded; (3) welding the flanges to the web; (4) removing the excess flux from the welded area; (5) propelling the welding machine along the girder; and (6) maintaining the orientation of the welding machine with respect to the girder. While the present invention is shown for use in welding plate girders, it is apparent that the machine could be modified so that box beams or other shaped beams could also be welded with this invention.

In maintaining the orientation of the welding machine, it is necessary to use the support stand on a guide until the entire welding machine has advanced onto the girder being welded. Once the entire welding machine including the guide unit is on the girder, the rollers 52 and 51 engage the inside flanges of the welded girder while rollers 16 and 24 engage the outside of the flanges to thereby maintain the orientation of the entire welding machine with respect to the girder.

It is thus apparent that the welding machine needs no additional guides to maintain the proper orientation of the welding machine with respect to the sections not yet welded.

We claim:

1. A traveling welding machine for simultaneously holding, guiding, welding and propelling the welding machine along components of an unwelded girder having a web and a first flange and a second flange to thereby produce a welded plate girder, said traveling welding machine comprising:

a support member for extending transverse of a girder to be welded, said support member including a first set of rollers for rollably transferring and supporting the traveling welding machine in an upright position, said first set of rollers having axis of rotation located in a first plane, said first set of rollers operable for forming rolling engagement with the web of a girder;

a second set of rollers for guiding said welding machine, said second set of rollers operable for forming rolling engagement with said first and said second flange of said girder, said second set of rollers having axis of rotation substantially perpendicular to said first set of rollers so that said second set of rollers can maintain the orientation of said support member with respect to the girder that is being welded;

a third pair of rollers located in a spaced relationship and having axis of rotation substantially parallel to said second set of rollers, said third set of rollers operable for forming rolling engagement with said first and said second flange of said girder;

a power actuated member attached to said third pair of rollers for simultaneously compressing the components of the girder into a weldable position and for propelling the traveling welding machine along the girder to be welded;

welding means mounted on said welding machine for welding the components of the girder into an integral plate girder member including a pair of welding heads, a pair of flux supply units, a pair of welding rod supply units and a pair of ducts for removing excess flux; whereby said welding means, said guide mechanism and said rollers mounted on said support member coact to simultaneously perform the function of holding, guiding, compressing, welding and propelling the welding machine along an unwelded girder.

* * * * *